May 3, 1966  E. N. WARD ET AL  3,248,863
LAWN MOWERS
Filed Sept. 25, 1964  5 Sheets-Sheet 1
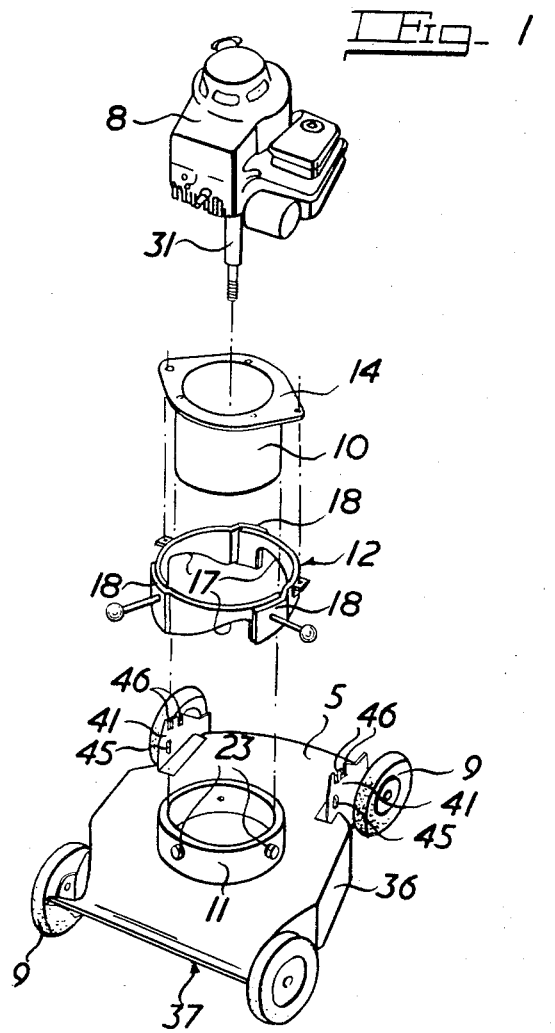

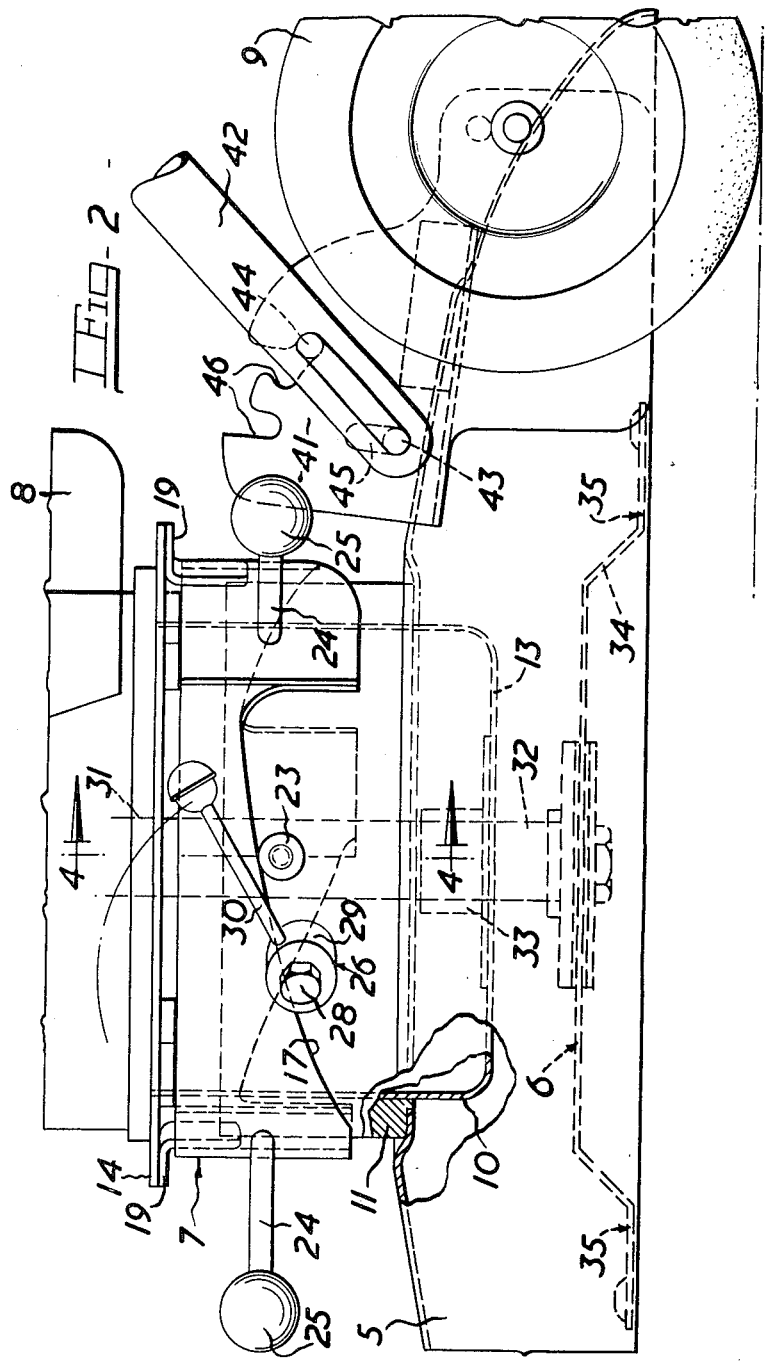

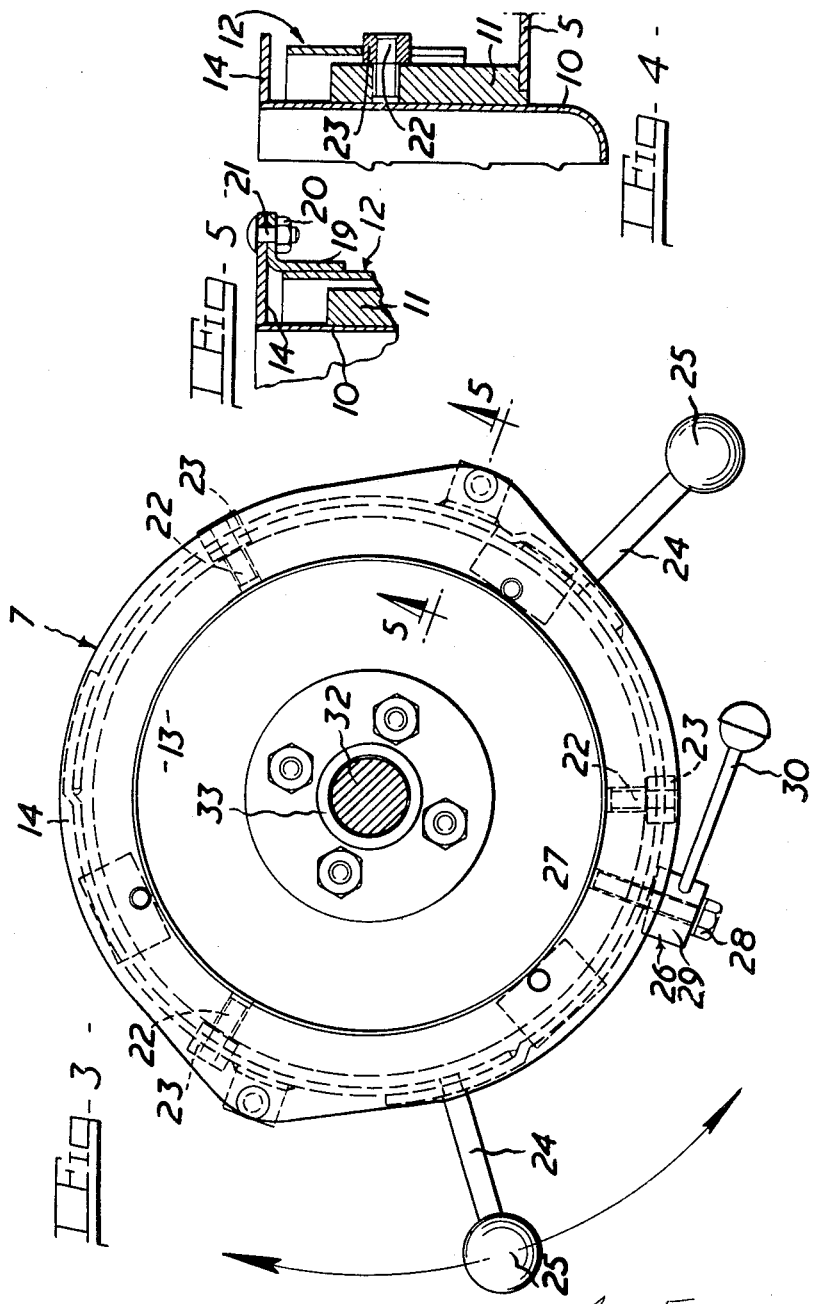

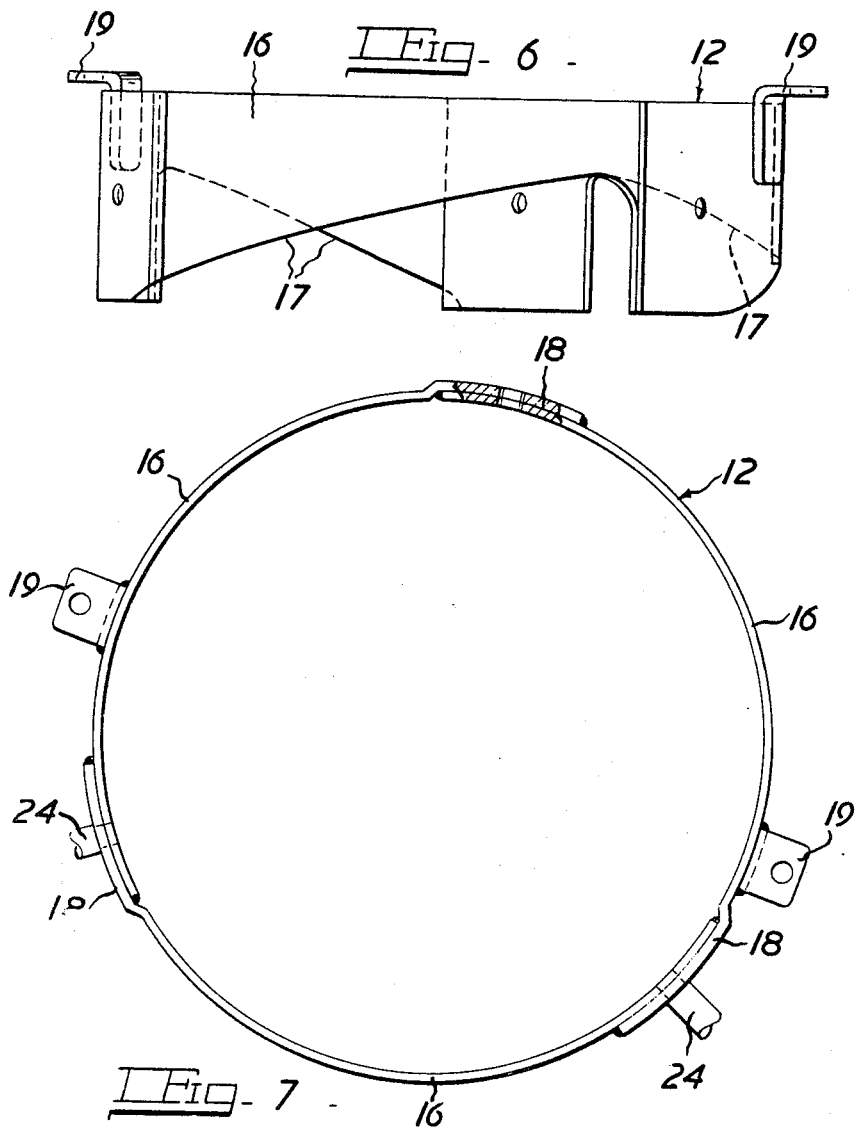

May 3, 1966  E. N. WARD ET AL  3,248,863
LAWN MOWERS
Filed Sept. 25, 1964  5 Sheets-Sheet 5
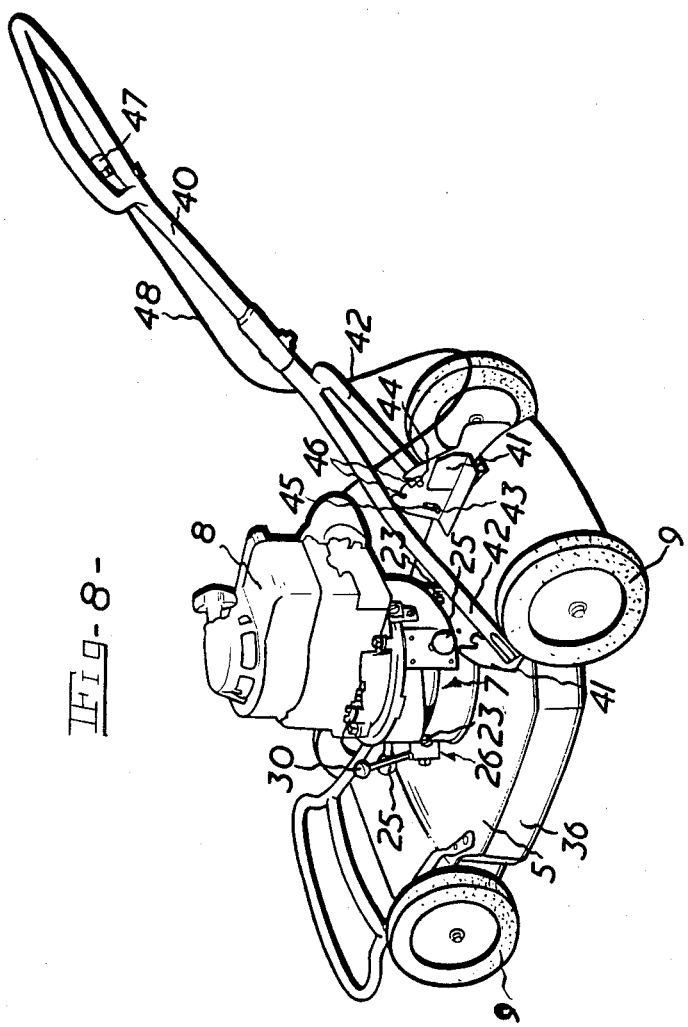
Fig-8-
Inventors:
Ernest Noel Ward
Frank Walter Taylor
By
Kenon, Palmer, Stewart &
Estabrook, Attorneys 3,248,863
LAWN MOWERS
Ernest Noel Ward, Moseley, Birmingham, England, and Frank Walter Taylor, deceased, late of Warwickshire, England, by Edith Miriam Taylor, executrix, Stratford-on-Avon, England, assignors to H. C. Webb & Company Limited, Birmingham, England, a British company
Filed Sept. 25, 1964, Ser. No. 399,409
6 Claims. (Cl. 56—25.4)

This invention relates to lawn mowers of the kind having a cutter which is rotatable about a vertical axis, the cutter being secured to operate in a horizontal plane at the lower end of a vertical shaft rotatable at high speed by a prime mover, for example an electric motor or an internal combustion engine. The cutter relies for its cutting action upon a sharp cutting edge and high rotational speed and is not provided with a ledger blade. The term "cutter" is used here to include any cutting means having a cutting edge or edges rotatable about the vertical axis of the shaft. Such lawn mowers are hereinafter referred to as "the kind described."

Lawn mowers of this kind are usually mounted on wheels which are capable of being adjusted with respect to their connections to the body of the mower to vary the height of the rotary cutter relative to the ground. This not only raises or lowers the cutter but also the whole of the mower mounted on the wheels including a guard or guards normally provided to shield the operator from possible injury in event of the, or part of the, cutter coming loose or a part of the cutter breaking away, for example as a result of striking a stone. When the cutter is adjusted very close to the ground this arrangement is quite satisfactory but from a safety point of view when the cutter is raised to other adjusted positions it is not such a satisfactory arrangement because the distance between the bottom of the guard and the ground is increased so that the guard is less effective.

It is an object of this invention to provide a lawn mower of this kind which has a wheeled carriage and in which the prime mover and cutter form an assembly which, for adjusting the height of the cutter in relation to the ground, is mounted to be bodily raised and lowered with respect to the carriage by a manual control, and the carriage includes around the cutter a guard whose height from the ground is unaffected by the adjustment of the cutter. The cutter is secured at the lower end of a shaft, usually known as the cutter bar, rigidly connected to the output shaft of the prime mover.

It is a further object of the invention to provide a lawn mower of this kind which has a wheeled carriage and in which the prime mover and cutter assembly is mounted on an adjusting member mounted for sliding movement along a vertical axis in a bearing on the carriage and under the control of adjusting means movable by the manual control and adapted to convert relative angular movement between the adjusting member and the bearing into relative axial movement. Preferably the adjusting means affords mechanical advantage in the adjustment of the prime mover and cutter assembly by the manual control.

An embodiment of the invention will now be described by way of example with reference to the accompanying drawings in which, FIGURE 1 is a small exploded front perspective view of a lawn mower according to the present invention.

FIGURE 2 is a fragmentary side view of the mower.

FIGURE 3 is a plan view of cutter height adjusting means.

FIGURE 4 is a fragmentary section on line 4—4 of FIGURE 2.

FIGURE 5 is a fragmentary section on line 5—5 of FIGURE 3.

FIGURES 6 and 7 are respectively side and plan views of part of the height adjusting means shown in FIGURE 3.

FIGURE 8 is a rear perspective view of the lawn mower.

The lawn mower of this embodiment, as shown in FIGURES 1, 2 and 8 comprises a cover 5 which fits over and around a rotary cutter 6 mounted on a height adjusting member 7 and rotatable by means of an internal combustion engine 8, the cover 5 being mounted on wheels 9 so that in addition to forming a protective guard against the rotary cutter 6 it also provides a carriage for the mower.

The adjusting member 7 comprises an inner sleeve 10 rotatably and axially slidable in a tubular bearing 11 secured in an opening in the upper surface of the cover 5, and an outer sleeve 12 rigid with the upper end of the inner sleeve 10. The inner sleeve 10 is in the form of a drum with a closed lower end 13 and an outwardly directed annular flange 14 at its upper end which forms a mounting for the internal combustion engine 8. The outer sleeve 12 is built up of three similar curved sheet metal pressings 16, FIGURE 7, each having a helically extending cam form 17, FIGURE 6, along its lower edge and formed with a joggled portion 18, FIGURE 7, where it overlaps and is secured, as by welding, to the next pressing 16. Rigidly secured to the upper end of two of the pressings 16, on diametrically opposite sides of the outer sleeve 12, are angle brackets 19 by means of which the outer sleeve is connected by nuts 20 and bolts 21, FIGURE 5, to the underside of the annular flange 14 of the inner sleeve 10.

The outer sleeve 12 is supported on three short radial, equi-spaced studs 22, FIGURE 4, secured to the tubular bearing 11, each stud being fitted with a nylon roller 23 with which the cam form 17 of a pressing 16 of the outer sleeve 12 co-operates. Two radial studs 24 are connected to and project radially outwardly from the outer sleeve at the joggled over-lapping portions 18 of two of the pressings 16, and each stud 24 is provided at its outer end with a knob 25 to form a handle whereby the outer sleeve, together with the inner sleeve, can be moved angularly. More than two handles may be provided if desired. As the outer sleeve is moved angularly by means of the handles and the cam forms move over the rollers 23 the complete adjusting member 7 is raised or lowered, according to the angular direction in which the outer sleeve is moved, together with the rotary cutter assembly and internal combustion engine 8. The arrangement of the cam forms 17 is such that their engagement with the rollers 23 causes the adjusting member 7 to be moved positively in the upward direction alone, the weight of the engine 8 and cutter assembly being relied upon to keep the cam forms and roller 23 in engagement during downward adjustment.

The ends of the cam forms 17 define the limits of vertical movement of the adjusting member in the bearing 11. In this embodiment the adjusting member is movable between its limits of vertical movement by approximately 80° of angular movement. The cam forms are so shaped that there is a wide range of height adjustment afforded to the cutter between the limits of angular movement. Locking means 26 is provided to retain the cutter at an adjusted height from the ground. This takes the form of a bolt 27 rigidly secured to and projecting radially outwards from the bearing 11, its head 28 outermost, close to one of the rollers 23, below the outer sleeve, on which bolt 27 is rotatably mounted a face cam 29 which overlaps the lower edge of the outer sleeve. A handle 30 is secured to the face cam 29 for turning the face cam on the bolt 27 to cause it to clamp the outer sleeve against the bearing 11 or to release it.

The engine 8 as previously stated is mounted on the flange 14 of the inner sleeve 10. An output shaft 31 of the engine 8 extends downwards axially of the inner sleeve, FIGURES 1 and 2, and is rigidly coupled inside the inner sleve to a cutter bar 32. The cutter bar 32 projects downwards through a bush 33, FIGURE 3, bolted in the closed end 13 of the inner sleeve 10. A cutter blade 34 is rigidly secured against angular and axial movement on the lower end of the cutter bar 32, below the inner sleeve 10. The cutter blade 34 is secured at the mid-point of its length to the cutter bar 32 and a cutting edge 35 is formed on each half of the blade. The cutter may comprise more than one blade if desired or it may be formed instead by sharp-edged discs attached to a plate secured to the cutter bar.

The length of the inner sleeve is arranged so that the lower end 13 of the sleeve and therefore the bush 33 is disposed close to the lower end of the cutter bar 32. By having the bush so disposed the possibility of vibrations being set up in the cutter bar 32 when rotated is eliminated and also in the event of the cutter blade 34 striking an obstruction the shock load on the cutter bar will be considerably reduced.

The cover 5 is in the form of a sheet metal pressing of generally rectangular plan shape with a depending skirt 36. The wheels 9 are fitted to the cover near each end of its longer sides and they support the cover so that there is only a small clearance between the bottom of the skirt 36 and the ground, except at the front of the mower where the skirt is foreshortened to leave an opening 37 for the passage of grass to the cutter.

A handle 40 for the operator to guide the mower is adjustably mounted on brackets 41 secured to the rear of the cover 5. The handle 40 has two spaced parallel limbs 42 at its lower end each of which is provided with two inwardly directed pins 43 and 44, FIGURES 2 and 8, a lower one 43 of which engages a vertical slot 45 in the adjacent bracket 41 and the upper one 44 of which is adapted to engage either of two open-ended notches 46 in the upper edge of the bracket 41. According to which of the two notches 46 the upper pin 44 engages the handle 40 is in an inclined operative or an upright stored position. To move the upper pin 44 from one notch to another the handle is lifted to move the lower pin 43 to the upper end of the vertical slot 45 so that the upper pin 44 clears the notch in which it was originally engaged. The handle, still raised, is then moved angularly about the lower pin 43 until the upper pin 44 is above the other notch and finally lowered so that the pin enters into that notch.

A hand control 47 is mounted on the handle for controlling the engine 8 through a cable 48.

What is claimed is:

1. A lawn mower comprising a wheeled carriage; a tubular bearing rigid with the wheeled carriage with its axis vertical; an adjusting member supported against gravitational force by the bearing and angularly and vertically movable relative to the bearing; manual control means connected to the adjusting member for moving the adjusting member angularly relative to the bearing; means interconnecting the bearing and adjusting member for converting angular movement of the adjusting member relative to the bearing into vertical movement of the adjusting member relative to the bearing; a prime mover supported by the adjusting member above the bearing; a vertical shaft rotatable at high speed by the prime mover and extending downwards through and below the adjusting member; a cutter secured to the lower end of the vertical shaft for rotation with the vertical shaft and disposed to operate in a horizontal plane; and a guard included in the wheeled carriage around the cutter, the guard thereby being unaffected by the adjustment of the cutter, said prime mover, vertical shaft and cutter constituting an assembly which is bodily movable with the adjusting member to adjust the height of the cutter in relation to the ground.

2. A lawn mower comprising a wheeled carriage; a tubular bearing rigid with the wheeled carriage at a constant height from the ground with its axis vertical; and adjusting member comprising a sleeve mounted co-axially of the bearing and movable angularly and vertically relative to the bearing; manual control means connected to the sleeve for moving the sleeve angularly relative to the bearing; a helical formation on the sleeve; a radial projection on the bearing engaging said helical formation and supporting said sleeve against gravitational force, said helical formation and radial projection co-operating to convert angular movement of the sleeve relative to the bearing into relative vertical movement of the sleeve; a prime mover supported by the sleeve member above the bearing; a vertical shaft rotatable at high speed by the prime mover and extending downwards through and below the sleeve; a cutter secured to the lower end of the vertical shaft for rotation with the vertical shaft and disposed to operate in a horizontal plane; and a guard included in the wheeled carriage around the cutter which guard remains at constant height from the ground, said prime mover, vertical shaft and cutter constituting an assembly which is bodily movable with the sleeve to adjust the height of the cutter in relation to the ground.

3. A lawn mower comprising a wheeled carriage; a tubular bearing rigid with the wheeled carriage at a constant height from the ground with its axis vertical; an adjusting member comprising a sleeve mounted co-axially and externally of the bearing and angularly and axially movable of the bearing; a handle secured to the sleeve for moving the sleeve angularly of the bearing; an outwardly directed radial projection on the bearing which supports said sleeve against gravitational force; a helical cam formation on the lower edge of the sleeve engaging with said radial projection, said cam formation being arranged to ride over said radial projection when the sleeve is moved angularly to convert the angular movement into vertical movement relative to the bearing; a prime mover supported by the sleeve above the bearing; a vertical shaft rotatable at high speed by the prime mover extending downwards through and below the sleeve; a cutter secured to the lower end of the vertical shaft for rotation with the vertical shaft and disposed to operate in a horizontal plane; and a guard included in the wheeled carriage around the cutter which guard remains at constant height from the ground, said prime mover, vertical shaft and cutter constituting an assembly which is bodily movable with the sleeve to adjust the height of the cutter in relation to the ground.

4. A lawn mower comprising a wheeled carriage; a tubular bearing rigid with the wheeled carriage at a constant height from the ground with its axis vertical; an adjusting member comprising an outer sleeve mounted co-axially and externally of the bearing and angularly and axially movable of the bearing, an inner sleeve of drum form with a closed lower end, which inner sleeve is co-axial with the outer sleeve and disposed internally of the bearing and secured at its upper end, above the bearing, to the upper end of the outer sleeve for movement with the outer sleeve, said inner sleeve extending through the bearing and having in its closed lower end an axial bush; a handle secured to the outer sleeve for moving the outer sleeve angularly of the bearing; an outwardly directed radial projection on the bearing which supports said outer sleeve against gravitational force; a helical cam formation on the lower edge of the outer sleeve engaging with said radial projection, said cam formation being arranged to ride over said radial projection when the outer sleeve is moved angularly to convert the angular movement into vertical movement relative to the bearing; a prime mover mounted on the upper end of the inner sleeve; a vertical shaft rotatable at high speed by the prime mover extending downwards axially through the inner sleeve and said bush which forms a bearing for the lower end of the vertical shaft; a cutter secured to the lower end of the vertical shaft below the bush for rotation with the vertical shaft and disposed to operate in a horizontal plane; and a guard included in the wheeled carriage around the cutter which guard remains at constant height from the ground, said prime mover, vertical shaft and cutter constituting an assembly which is bodily movable with the inner sleeve and outer sleeve to adjust the height of the cutter in relation to the ground.

5. A lawn mower according to claim 4 wherein the outer sleeve comprises at least two connected curved sheet metal pressings each having a similar cam formation on its lower edge.

6. A lawn mower according to claim 4 wherein locking means are provided to retain the cutter at an adjusted height from the ground, said locking means comprising a member rigid with and projecting radially outwards from the bearing below the outer sleeve, and a face cam rotatably mounted on said member, said face cam overlying the external surface of the outer sleeve adjacent the cam formation and adapted on rotation to urge the outer sleeve into or out of engagement with the bearing.

References Cited by the Examiner
FOREIGN PATENTS 141,323   5/1951   Australia.

ABRAHAM G. STONE, *Primary Examiner.*